(12) United States Patent
Reini et al.

(10) Patent No.: US 11,052,847 B2
(45) Date of Patent: Jul. 6, 2021

(54) IMPACT BEAM FOR VEHICLES

(71) Applicant: GM GLOBAL TECHNOLOGY OPERATIONS LLC, Detroit, MI (US)

(72) Inventors: Luke A. Reini, Clarkston, MI (US); Julie A. Bryce, Novi, MI (US); Laura L. Tanton, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 102 days.

(21) Appl. No.: 16/687,008

(22) Filed: Nov. 18, 2019

(65) Prior Publication Data

US 2021/0146865 A1    May 20, 2021

(51) Int. Cl.
*B60J 7/00* (2006.01)
*B60R 19/18* (2006.01)

(52) U.S. Cl.
CPC ........ *B60R 19/18* (2013.01); *B60R 2019/182* (2013.01); *B60R 2019/1886* (2013.01)

(58) Field of Classification Search
CPC .......... B62D 25/088; B62D 9/02; B62K 5/10; B62K 5/05; B60G 2300/122; B60G 2204/128
See application file for complete search history.

(56) References Cited

U.S. PATENT DOCUMENTS

| 3,926,462 | A | * | 12/1975 | Burns | B60R 19/18 293/136 |
|---|---|---|---|---|---|
| 4,061,384 | A | * | 12/1977 | Montgomery | B60R 19/18 293/109 |
| 4,929,008 | A | * | 5/1990 | Esfandiary | B60R 19/20 188/376 |
| 4,974,891 | A | * | 12/1990 | Furuta | B60R 19/02 293/104 |
| 6,428,064 | B1 | * | 8/2002 | Frederick | B60R 19/18 293/120 |
| 6,435,579 | B1 | * | 8/2002 | Glance | B60R 19/18 293/102 |
| 2019/0071040 | A1 | * | 3/2019 | Romero | B60R 19/18 |
| 2019/0248313 | A1 | * | 8/2019 | Garbutt | B60R 19/34 |
| 2020/0324720 | A1 | * | 10/2020 | Wright | B60R 19/40 |

* cited by examiner

*Primary Examiner* — Kiran B Patel
(74) *Attorney, Agent, or Firm* — Quinn IP Law (57) ABSTRACT

An exemplary impact beam for a vehicle includes a body defining a longitudinal axis of the impact beam. The body has a first longitudinal surface laterally separated from a second longitudinal surface, a first end including a first extension and a second extension such that the first and second extensions form a "T"-shape with the first and second longitudinal surfaces of the body, and a second end opposite the first end, the second end including a first extended portion and a second extended portion connected to the first extended portion by a connecting surface. The first extended portion is configured to extend into a first crush space defined by a fascia of the vehicle and the second extended portion is configured to extend into a second crush space defined by the fascia of the vehicle.

20 Claims, 7 Drawing Sheets

IMPACT BEAM FOR VEHICLES

INTRODUCTION

The present disclosure relates generally to a vehicle structural member that improves a vehicle response to low- and high-speed impact events while supporting aggressive vehicle styling.

Aggressive vehicle styling can create gaps between the fascia or styled surface and the impact beam of the vehicle structure. These gaps prevent an impact beam from fitting snugly against the fascia or styled surface and filling the available crush space. Thus, an improved impact beam structure is desired to fill the available crush space and improve the vehicle response to impact events.

SUMMARY

Embodiments according to the present disclosure provide a number of advantages. For example, embodiments according to the present disclosure more closely align with aggressively styled vehicle surfaces to fill available crush space and improve the vehicle response to impact events. In various embodiments, an impact beam member optimizes the packaging space between the body structure and an aggressively styled vehicle exterior surface to enable improved response of the vehicle to both low-speed and high-speed bumper regulations.

In one aspect of an exemplary embodiment of the present disclosure, an impact beam for a vehicle includes a body defining a longitudinal axis of the impact beam. The body has a first longitudinal surface laterally separated from a second longitudinal surface, a first end including a first extension and a second extension such that the first and second extensions form a "T"-shape with the first and second longitudinal surfaces of the body, and a second end opposite the first end, the second end including a first extended portion and a second extended portion connected to the first extended portion by a connecting surface. The first extended portion is configured to extend into a first crush space defined by a fascia of the vehicle and the second extended portion is configured to extend into a second crush space defined by the fascia of the vehicle.

In some aspects, the first extended portion and the second extended portion are configured to mimic an inner surface of the fascia of the vehicle.

In some aspects, the impact beam further includes a first cutout edge defining a first opening in the body of the impact beam.

In some aspects, the impact beam further includes a second cutout edge defining a second opening in the second end of the impact beam.

In some aspects, the impact beam further includes a first catch member extending in a first lateral direction away from the body of the impact beam and a second catch member extending in a second lateral direction away from the body of the impact beam opposite the first direction.

In some aspects, the first and second catch members are symmetrically oriented relative to the longitudinal axis of the body of the impact beam.

In some aspects, the first and second catch members are asymmetrically oriented relative to the longitudinal axis of the body of the impact beam.

In some aspects, the first extended portion includes a first terminal end portion and the second extended portion includes a second terminal end portion, the first terminal end portion forming a "J" shape with the first extended portion and the second terminal end portion forming a "J" shape with the second extended portion.

In some aspects, the body, the first end, and the second end are integrally formed as a single component and the single component is one of a cast aluminum component and a cast magnesium component.

In some aspects, the first end is welded to a first end of the body and the second end is welded to a second end of the body opposite the first end, and the first end, the body, and the second end, are formed from aluminum.

In another aspect of an embodiment of the present disclosure, an automotive vehicle includes an impact beam and a fascia. The impact beam includes a body having a first longitudinal surface laterally separated from a second longitudinal surface, a first end including a first extension and a second extension such that the first and second extensions form a "T"-shape with the first and second longitudinal surfaces of the body, and a second end opposite the first end, the second end including an extended portion and a second extended portion connected to the first extended portion by a connecting surface. The fascia has an inner surface and an outer surface and includes a curve creating a crush space between the inner surface of the fascia and the body of the impact beam. The first extended portion is configured to extend into a first portion of the crush space defined by the fascia and the second extended portion is configured to extend into a second portion crush space defined by the fascia of the automotive vehicle.

In some aspects, the first extended portion and the second extended portion of the impact beam are configured to mimic the inner surface of the fascia of the vehicle.

In some aspects, the impact beam further includes a first cutout edge defining a first opening in the body of the impact beam.

In some aspects, the impact beam further includes a second cutout edge defining a second opening in the second end of the impact beam.

In some aspects, the impact beam further includes a first catch member extending in a first lateral direction away from the body of the impact beam and a second catch member extending in a second lateral direction away from the body of the impact beam opposite the first direction.

In some aspects, the first and second catch members are symmetrically oriented relative to the longitudinal axis of the body of the impact beam.

In some aspects, the first and second catch members are asymmetrically oriented relative to the longitudinal axis of the body of the impact beam.

In some aspects, the first extended portion includes a first terminal end portion and the second extended portion includes a second terminal end portion, the first terminal end portion forming a "J" shape with the first extended portion and the second terminal end portion forming a "J" shape with the second extended portion.

In some aspects, the first end is welded to a first end of the body and the second end is welded to a second end of the body opposite the first end, and the first end, the body, and the second end, are formed from aluminum.

In another aspect of an embodiment of the present disclosure, an impact beam for a vehicle includes a body defining a longitudinal axis of the impact beam. The body has a first longitudinal surface laterally separated from a second longitudinal surface, a first end, and a second end opposite the first end, the second end including a first extended portion and a second extended portion connected to the first extended portion by a connecting surface, the body including a plurality of cutout edges defining a plurality of parallel openings extending longitudinally through the impact beam. The first extended portion is configured to extend into a first crush space defined by a fascia of the vehicle and the second extended portion is configured to extend into a second crush space defined by the fascia of the vehicle and the impact beam is a unitary, cast aluminum component.

BRIEF DESCRIPTION OF THE DRAWINGS

The present disclosure will be described in conjunction with the following figures, wherein like numerals denote like elements.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import. Throughout the various figures, like reference numbers refer to like components and features.

Some vehicle styling designs include design features that protrude rearward on rear fascia (or forward on front fascia). These design features may be very thin/narrow and/or long. Current impact beam designs do not fit snugly within these features against an interior surface of the fascia(s) and thus do not optimally fill the available crush space. Embodiments of the present disclosure include a bumper impact beam that more closely mimics the interior fascia surface to effectively fill and optimize use of the packaging space between the vehicle body structure and the interior surface of an aggressively styled vehicle fascia surface. The embodiments of the present disclosure move an offset plane further rearward (in the case of an impact beam installed adjacent to the rear fascia) or further forward (in the case of an impact beam installed adjacent to the front fascia), permitting other vehicle body components to be moved closer to each end of the vehicle.

Figure 1:
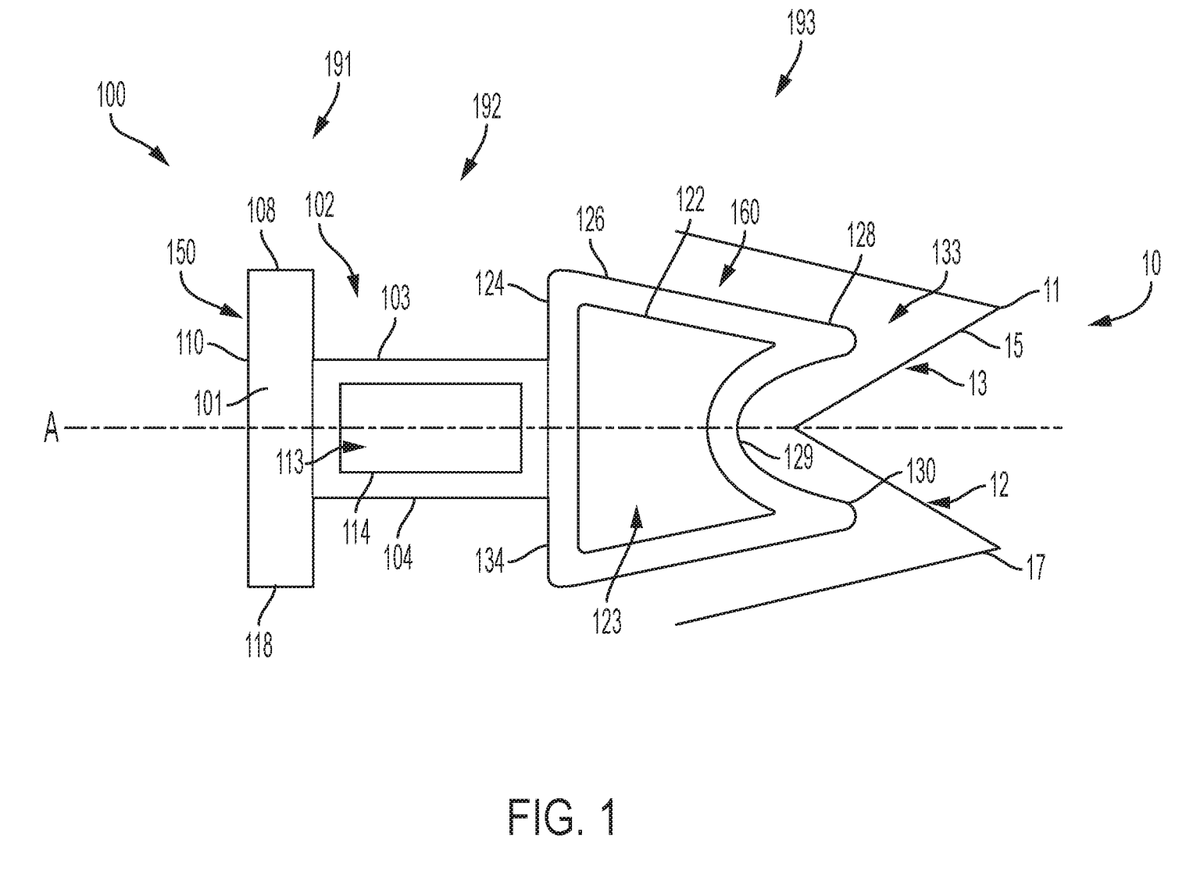
FIG. 1 is a side cross-sectional view of an impact beam assembly for a vehicle, according to an embodiment of the disclosure.

FIG. 1 illustrates an impact beam assembly 100 for a vehicle 10, according to an embodiment of the disclosure. The impact beam assembly 100 includes an impact beam 102 that is configured to approximately mimic the curves/bends/features of a fascia 11 of the vehicle 10 and minimize a crush space 133 defined between the fascia 11 and the impact beam 102.

The fascia 11 of the vehicle 10 includes an inner surface 12 and an outer surface 13. In various embodiments, the fascia 11 includes one or more aggressive features, such as curves, bends, points, extensions, etc., such as the features 15, 17, that create additional air or crush space 133 between the inner surface 12 of the fascia 11 and the vehicle structure, such as the vehicle frame or chassis (not shown). In various embodiments, the fascia 11 is either a forward fascia or a rearward fascia of the vehicle 10. Previous impact beam designs cannot be packaged efficiently into these aggressively styled areas.

The impact beam 102 is configured to fill the crush space 133 and follow the contours of the fascia 11. The impact beam 102 includes a body 101. The body 101 is defined by a first longitudinal surface 103 and a second longitudinal surface 104 approximately parallel to and spaced apart from the first longitudinal surface 103. In various embodiments, a first end 150 of the impact beam 102 includes two extensions 108, 118 that together with the first and second longitudinal surfaces 103, 104 form a "T" shaped body 101. In various embodiments, an end surface 110 forms a terminal end of the first end 150 of the body 101.

The impact beam 102 also includes a second end 160 opposite the first end 150. The second end 160 includes a surface 126 that is connected to the surfaces 103, 104 via the perpendicular surfaces 124, 134. That is, the surface 126 is adjacent to and contiguous with the surfaces 124, 134. As shown in FIG. 1, the surface 126 of the second end 160 includes two extended portions 128, 130. The extended portions 128, 130 are connected by a connecting surface 129. In various embodiments, the connecting surface 129 is curved. The second end 160 of the impact beam 102 is configured to follow the curves, bends, and other features of the fascia 11 and fill at least a portion of the air or crush space 133 between the impact beam 102 and the fascia 11.

The impact beam 102 is generally arranged along a longitudinal axis A such that the first end 150 and the second end 160 are separated by a distance along the longitudinal axis A. In various embodiments, a width of the impact beam 102 is generally wider at the first and second ends 150, 160 such that the first and second ends 150, 160 are connected by a narrower portion of the body 101. However, in other embodiments, the impact beam 102 is the same width at both ends 150, 160, or is wider at one end versus the other end, depending on vehicle configuration, styling, packing constraints, etc., for example and without limitation.

In various embodiments, the first end 150 of the body 101 is a first component 191 joined to a second component 192, wherein the second component 192 includes the body 101 formed from the first and second longitudinal surfaces 103, 104). In various embodiments, the second end 160 of the body 101 is a third component 193 coupled to the second component 192. In various embodiments, the first and second components 191, 192 are coupled by a chemical process such as welding and/or by one or more mechanical fasteners, such as bolts, etc. In various embodiments, the second and third components 192, 193 are coupled by a chemical process such as welding and/or by one or more mechanical fasteners, such as bolts, etc. In various embodiments, the first and second components 191, 192 are formed as a single component and the third component 193 is coupled to the unitary first and second component 191, 192 via a chemical process such as welding and/or one or more mechanical fasteners, such as bolts, etc. However, other embodiments include various other combinations of manufacture of the impact beam 102 from one, two, three, or more separate components.

In various embodiments, the extended portion 128 extends into the crush space 133 created by the feature 15 and, similarly, the extended portion 130 extends into the crush space 133 created by the feature 17. The extended portions 128, 130 may be rounded or otherwise shaped to fit within the crush space 133. The connecting surface 129 connects the extended portions 128, 130 and in various embodiments is concave to approximately follow or mimic the inner surface 12 of the fascia 11 between the features 15, 17.

With continued reference to FIG. 1, in some embodiments, the impact beam 102 includes a first cutout edge 114. The first cutout edge 144 defines a first opening 113 in the body 101 of the impact beam 102. The first cutout edge 114 may be included in some embodiments to reduce the overall weight of the impact beam 102 by removing material from the impact beam 102 to generate the first opening 113. In some embodiments, the impact beam 102 includes a second cutout edge 122 defining a second opening 123 in the second end 160 of the impact beam 102. Similarly, material may be removed from the impact beam 102 to create the second opening 123 to reduce the overall weight of the impact beam 102. In some embodiments, the impact beam 102 includes one or both of the first and second openings 113, 123; however, in other embodiments, the impact beam 102 is a solid piece without weight-saving openings.

While the embodiment illustrated in FIG. 1 includes two extended portions 128, 130, it is understood that other embodiments may include more or fewer extended portions, to align with the more or fewer features of the fascia 11 of the vehicle 10.

Figure 2:
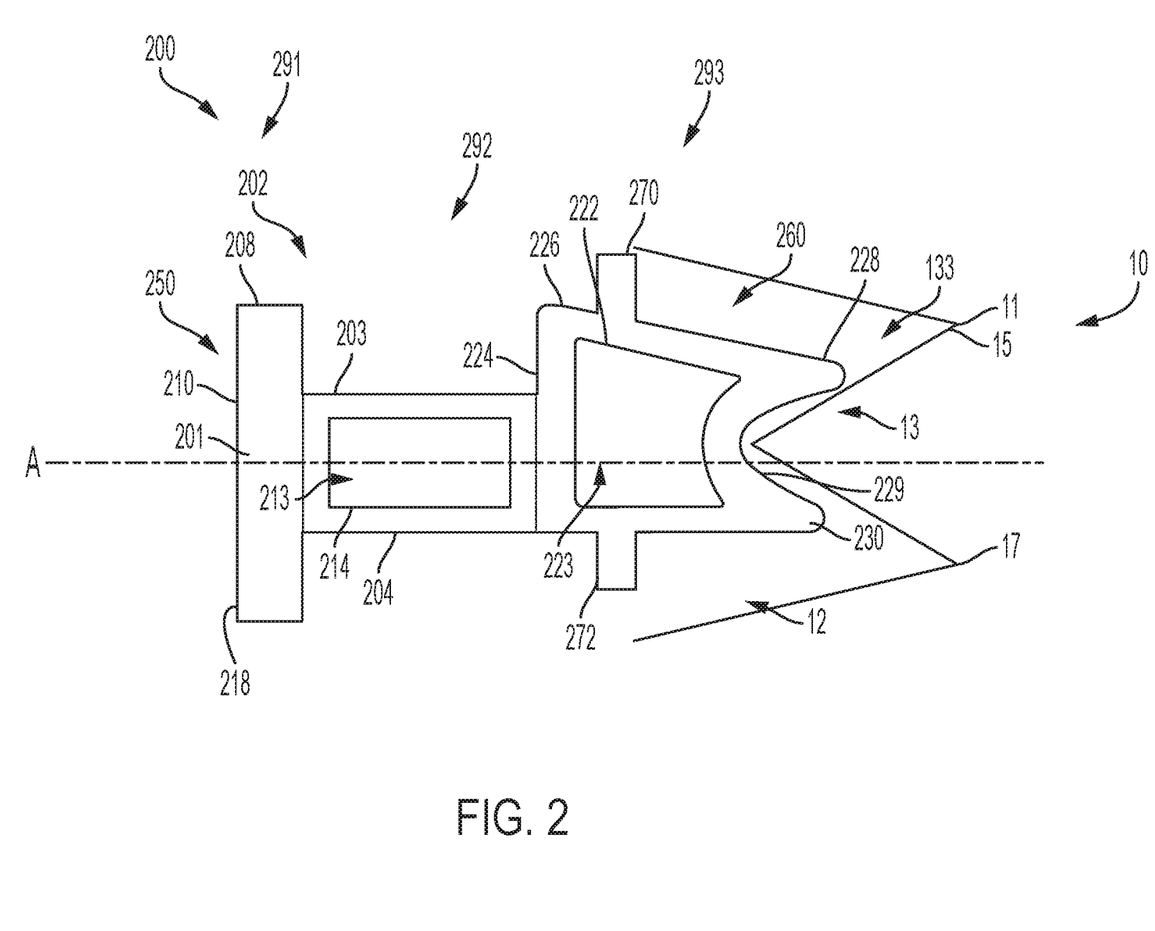
FIG. 2 is a side cross-sectional view of an impact beam assembly for a vehicle, according to another embodiment of the disclosure.

FIG. 2 illustrates an impact beam assembly 200 for a vehicle 10, according to an embodiment of the disclosure. The impact beam assembly 200 includes an impact beam 202 that is configured to approximately mimic the curves/bends/features of the fascia 11 of the vehicle 10 and minimize the crush space 133 defined between the fascia 11 and the impact beam 202.

Similar to the impact beam 102 discussed above, the impact beam 202 is configured to fill the crush space 133 and follow the contours of the fascia 11. The impact beam 202 includes a body 201. The body 201 is defined by a first longitudinal surface 203 and a second longitudinal surface 204 approximately parallel to and spaced apart from the first longitudinal surface 203. In various embodiments, a first end 250 of the impact beam 202 includes two extensions 208, 218 that together with the first and second longitudinal surfaces 203, 204 form a "T" shaped body 201. In various embodiments, an end surface 210 forms a terminal end of the first end 250 of the body 201.

The impact beam 202 also includes a second end 260 opposite the first end 250. The second end 260 includes a surface 226 that is connected to the surface 203 via the perpendicular surface 224. That is, the surface 226 is adjacent to and contiguous with the surface 224. As shown in FIG. 2, the surface 226 of the second end 260 includes two extended portions 228, 230. The extended portions 228, 230 are connected by a curved surface 229. The second end 260 of the impact beam 202 is configured to follow the curves, bends, and other features of the fascia 11 and fill at least a portion of the air or crush space 133 between the impact beam 202 and the fascia 11.

The impact beam 202 is generally arranged along the longitudinal axis A such that the first end 250 and the second end 260 are separated by a distance along the longitudinal axis A. In various embodiments, a width of the impact beam 202 is generally wider at the first and second ends 250, 260 such that the first and second ends 250, 260 are connected by a narrower portion of the body 201. However, in other embodiments, the impact beam 202 is the same width at both ends 250, 260, or is wider at one end versus the other end, depending on vehicle configuration, styling, packing constraints, etc., for example and without limitation. In various embodiments, as shown in FIG. 2, the impact beam 202 is asymmetrical about the longitudinal axis A, that is, as shown in FIG. 2, the second end 260 is positioned more on one side of the longitudinal axis A.

In various embodiments, the first end 250 of the body 201 is a first component 291 joined to a second component 292, wherein the second component 292 includes the body 201 formed from the first and second longitudinal surfaces 203, 204). In various embodiments, the second end 260 of the body 201 is a third component 293 coupled to the second component 292. In various embodiments, the first and second components 291, 292 are coupled by a chemical process such as welding and/or by one or more mechanical fasteners, such as bolts, etc. In various embodiments, the second and third components 292, 293 are coupled by a chemical process such as welding and/or by one or more mechanical fasteners, such as bolts, etc. In various embodiments, the first and second components 291, 292 are formed as a single component and the third component 293 is coupled to the unitary first and second component 291, 292 via a chemical process such as welding and/or one or more mechanical fasteners, such as bolts, etc. However, other embodiments include various other combinations of manufacture of the impact beam 202 from one, two, three, or more separate components.

In various embodiments, the extended portion 228 extends into the crush space 133 created by the feature 15 and, similarly, the extended portion 230 extends into the crush space 133 created by the feature 17. The extended portions 228, 230 may be rounded or otherwise shaped to fit within the crush space 133. A connecting surface 229 connects the extended portions 228, 230 and may be concave to approximately follow or mimic the inner surface 12 of the fascia 11 between the features 15, 17.

Similar to the impact beam 102, in some embodiments, the impact beam 202 includes one or more openings 213, 223 defined by cutout edges 214, 222, to reduce the overall weight of the impact beam 202.

In various embodiments, the impact beam 202 includes one or more catch members 270, 272. The catch members 270, 272 extend laterally away from the body 201 of the impact beam 202 in opposite directions and are configured to engage with an impact test structure, such as a pendulum. In various embodiments, as shown in FIG. 2, the catch members 270, 272 are not symmetrically oriented relative to the longitudinal axis A. In other embodiments, the catch members 270, 272 are symmetrically oriented relative to the longitudinal axis A.

While the embodiment illustrated in FIG. 2 includes two extended portions 228, 230, it is understood that other embodiments may include more or fewer extended portions, to align with the more or fewer features of the fascia 11 of the vehicle 10.

Figure 3:
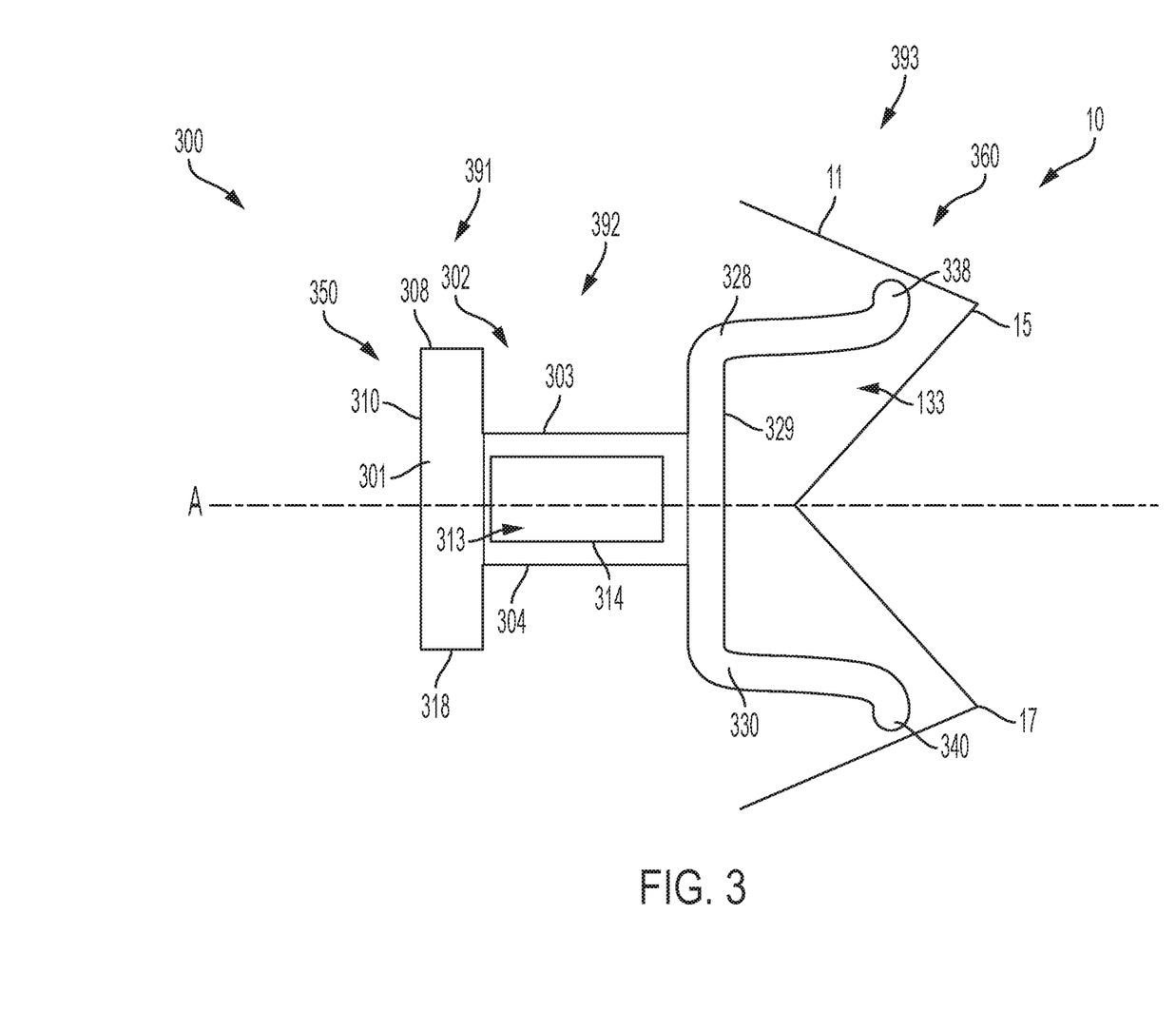
FIG. 3 is a side cross-sectional view of an impact beam assembly for a vehicle, according to another embodiment of the disclosure.

FIG. 3 illustrates an impact beam assembly 300 for a vehicle 10, according to an embodiment of the disclosure. The impact beam assembly 300 includes an impact beam 302 that is configured to approximately mimic the curves/bends/features of the fascia 11 of the vehicle 10 and minimize the crush space 133 defined between the fascia 11 and the impact beam 302.

Similar to the impact beams 102, 202 discussed above, the impact beam 302 is configured to fill the crush space 133 and follow the contours of the fascia 11. The impact beam 302 includes a body 301. The body 301 is defined by a first longitudinal surface 303 and a second longitudinal surface 304 approximately parallel to and spaced apart from the first longitudinal surface 303. In various embodiments, a first end 350 of the impact beam 302 includes two extensions 308, 318 that together with the first and second longitudinal surfaces 303, 304 form a "T" shaped body 301. In various embodiments, an end surface 310 forms a terminal end of the first end 350 of the body 301.

The impact beam 302 also includes a second end 360 opposite the first end 350. The second end 360 includes two extended portions 328, 330 connected by a surface 329. As shown in FIG. 3, the two extended portions 328, 330 resemble legs extending both laterally and longitudinally from the body 301 of the impact beam 302. In various embodiments, the extended portion 328 includes a terminal end portion 338, and, similarly, the extended portion 330 includes a terminal end portion 340. Each of the terminal end portions 338, 340 are flanges oriented at an angle from each of the extended portions 328, 330. As shown in FIG. 3, the extended portions 328, 330 and the terminal end portions 338, 340 are extensions of the impact beam 302 that extend into the crush space 133 between the impact beam 302 and the fascia 11. In various embodiments, the extended portion 328 and the terminal end portion 338 extend into the crush space 133 created by the feature 15 and, similarly, the extended portion 330 and the terminal end portion 340 extend into the crush space 133 created by the feature 17. In various embodiments, the terminal end portions 338, 340 define planes that are not coplanar with the planes defined by the extended portions 328, 330. In other words, the terminal end portion 338 defines a plane that is not coplanar with a plane of the extended portion 328 and the terminal end portion 340 defines another plane that is not coplanar with a plane of the extended portion 330. In various embodiments, the terminal end portions 338, 340 are arcuate shapes relative to the extended portions 328, 330 such that the terminal end portions 338, 340 create a "C" or "J" shape at the end of each extended portion 328, 330.

In various embodiments, the first end 350 of the body 301 is a first component 391 joined to a second component 392, wherein the second component 392 includes the body 301 formed from the first and second longitudinal surfaces 303, 304). In various embodiments, the second end 360 of the body 301 is a third component 393 coupled to the second component 392. In various embodiments, the first and second components 391, 392 are coupled by a chemical process such as welding and/or by one or more mechanical fasteners, such as bolts, etc. In various embodiments, the second and third components 392, 393 are coupled by a chemical process such as welding and/or by one or more mechanical fasteners, such as bolts, etc. In various embodiments, the first and second components 391, 392 are formed as a single component and the third component 393 is coupled to the unitary first and second component 391, 392 via a chemical process such as welding and/or one or more mechanical fasteners, such as bolts, etc. However, other embodiments include various other combinations of manufacture of the impact beam 302 from one, two, three, or more separate components.

The extended portions 328, 330 may be oriented at an angle relative to the body 301 and shaped to fit within the crush space 133. A connecting surface 329 connects the extended portions 328, 330 and may be straight or curved to approximately follow or mimic the inner surface 12 of the fascia 11 between the features 15, 17, depending on packaging constraints, vehicle configuration, etc., for example and without limitation.

The impact beam 302 is generally arranged along the longitudinal axis A such that the first end 350 and the second end 360 are separated by a distance along the longitudinal axis A. In various embodiments, a width of the impact beam 302 is generally wider at the first and second ends 350, 360 such that the first and second ends 350, 360 are connected by a narrower portion of the body 301. However, in other embodiments, the impact beam 302 is the same width at both ends 350, 360, or is wider at one end versus the other end, depending on vehicle configuration, styling, packing constraints, etc., for example and without limitation. In various embodiments, as shown in FIG. 3, the impact beam 302 is asymmetrical about the longitudinal axis A, that is, as shown in FIG. 3, the second end 360 is positioned more on one side of the longitudinal axis A. However, in other embodiments, the impact beam 302 is symmetrical about the longitudinal axis A.

Similar to the impact beam 102, in some embodiments, the impact beam 302 includes an opening 313 defined by the cutout edge 314 to reduce the overall weight of the impact beam 302.

While the embodiment illustrated in FIG. 3 includes two extended portions 328, 330, it is understood that other embodiments may include more or fewer extended portions, to align with the more or fewer features of the fascia 11 of the vehicle 10.

Figure 4:
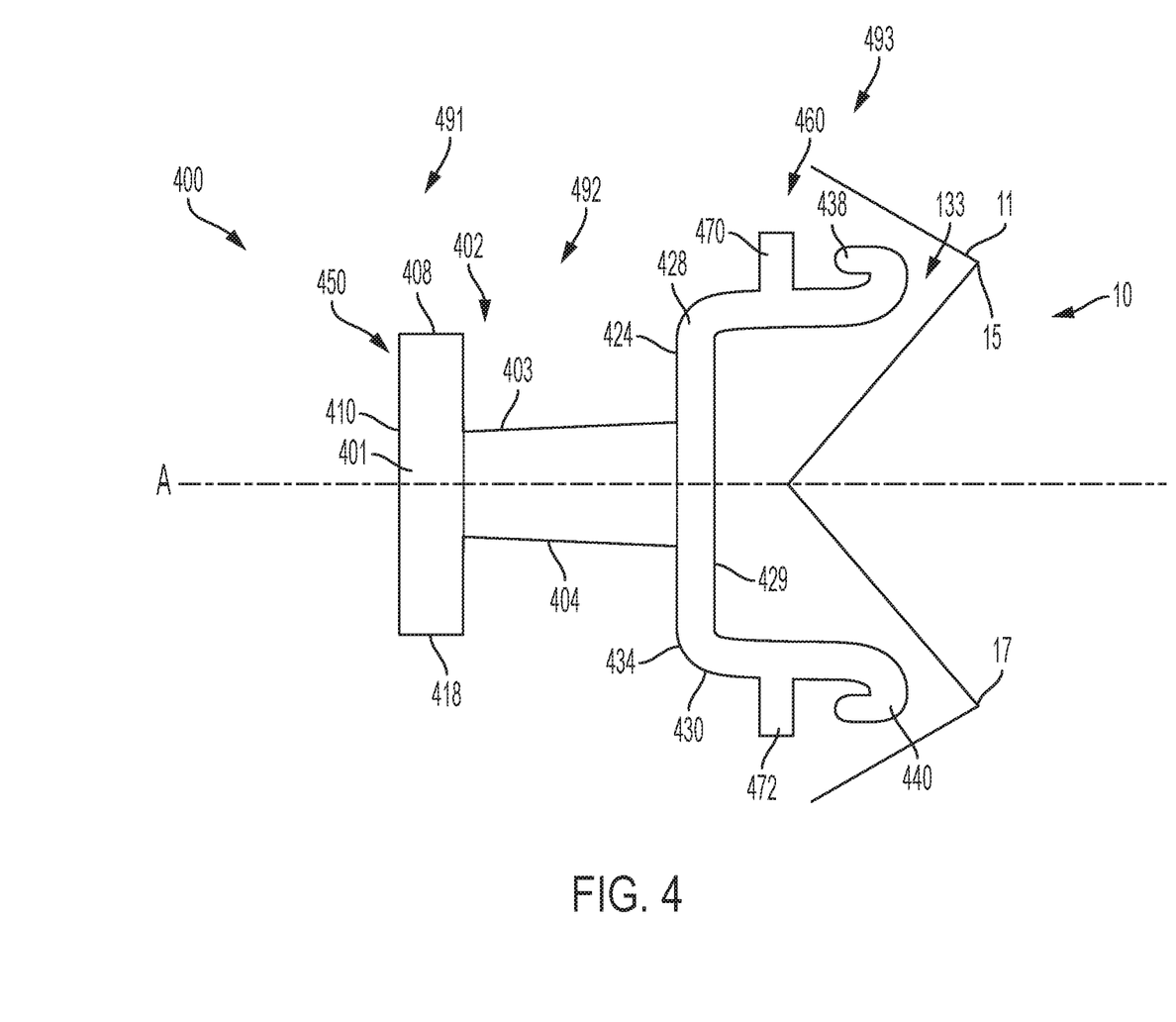
FIG. 4 is a side cross-sectional view of an impact beam assembly for a vehicle, according to another embodiment of the disclosure.

FIG. 4 illustrates an impact beam assembly 400 for a vehicle 10, according to an embodiment of the disclosure. The impact beam assembly 400 includes an impact beam 402 that is configured to approximately mimic the curves/bends/features of the fascia 11 of the vehicle 10 and minimize the crush space 133 defined between the fascia 11 and the impact beam 402.

Similar to the impact beams 102, 202, 302 discussed above, the impact beam 402 is configured to fill the crush space 133 and follow the contours of the fascia 11. The impact beam 402 includes a body 401. The body 401 is defined by a first longitudinal surface 403 and a second longitudinal surface 404 approximately parallel to and spaced apart from the first longitudinal surface 403. In various embodiments, a first end 450 of the impact beam 402 includes two extensions 408, 418 that together with the first and second longitudinal surfaces 403, 404 form a "T" shaped body 401. In various embodiments, an end surface 410 forms a terminal end of the first end 450 of the body 401.

The impact beam 402 also includes a second end 460 opposite the first end 450. The second end 460 includes two extended portions 428, 430 connected by a surface 429. As shown in FIG. 4, the two extended portions 428, 430 resemble legs extending both laterally and longitudinally from the body 401 of the impact beam 402. In various embodiments, the extended portion 428 includes a terminal end portion 438, and, similarly, the extended portion 430 includes a terminal end portion 440. Each of the terminal end portions 438, 440 are flanges oriented at an angle from each of the extended portions 428, 430. As shown in FIG. 4, the extended portions 428, 430 and the terminal end portions 438, 440 are extensions of the impact beam 402 that extend into the crush space 133 between the impact beam 402 and the fascia 11. In various embodiments, the extended portion 428 and the terminal end portion 438 extend into the crush space 133 created by the feature 15 and, similarly, the extended portion 430 and the terminal end portion 440 extend into the crush space 133 created by the feature 17. The extended portions 428, 430 may be oriented at an angle relative to the body 401 and shaped to fit within the crush space 133. In various embodiments, the terminal end portions 438, 440 are arcuate shapes relative to the extended portions 428, 430 such that the terminal end portions 438, 440 create a "C" or "J" shape at the end of each extended portion 428, 430.

In various embodiments, the first end 450 of the body 401 is a first component 491 joined to a second component 492, wherein the second component 492 includes the body 401 formed from the first and second longitudinal surfaces 403, 404). In various embodiments, the second end 460 of the body 401 is a third component 493 coupled to the second component 492. In various embodiments, the first and second components 491, 492 are coupled by a chemical process such as welding and/or by one or more mechanical fasteners, such as bolts, etc. In various embodiments, the second and third components 492, 493 are coupled by a chemical process such as welding and/or by one or more mechanical fasteners, such as bolts, etc. In various embodiments, the first and second components 491, 492 are formed as a single component and the third component 493 is coupled to the unitary first and second component 491, 492 via a chemical process such as welding and/or one or more mechanical fasteners, such as bolts, etc. However, other embodiments include various other combinations of manufacture of the impact beam 402 from one, two, three, or more separate components.

A connecting surface 429 connects the extended portions 428, 430 and may be straight or curved to approximately follow or mimic the inner surface 12 of the fascia 11 between the features 15, 17, depending on packaging constraints, vehicle configuration, etc., for example and without limitation.

In various embodiments, the impact beam 402 includes one or more catch members 470, 472. The catch members 470, 472 extend away from the body 401 of the impact beam 402 and are configured to engage with an impact test structure, such as a pendulum. In various embodiments, as shown in FIG. 4, the catch members 470, 472 are symmetrically oriented relative to the longitudinal axis A. In other embodiments, the catch members 470, 472 are not symmetrically oriented relative to the longitudinal axis A.

The impact beam 402 is generally arranged along the longitudinal axis A such that the first end 450 and the second end 460 are separated by a distance along the longitudinal axis A. In various embodiments, the impact beam 402 is symmetrical about the longitudinal axis A. However, in other embodiments, the impact beam 402 is asymmetrical about the longitudinal axis A.

Similar to the impact beam 102, while not shown in FIG. 4, in some embodiments, the impact beam 402 includes one or more openings defined by cutout edges to reduce the overall weight of the impact beam 402.

While the embodiment illustrated in FIG. 4 includes two extended portions 428, 430, it is understood that other embodiments may include more or fewer extended portions, to align with the more or fewer features of the fascia 11 of the vehicle 10.

Figure 5:
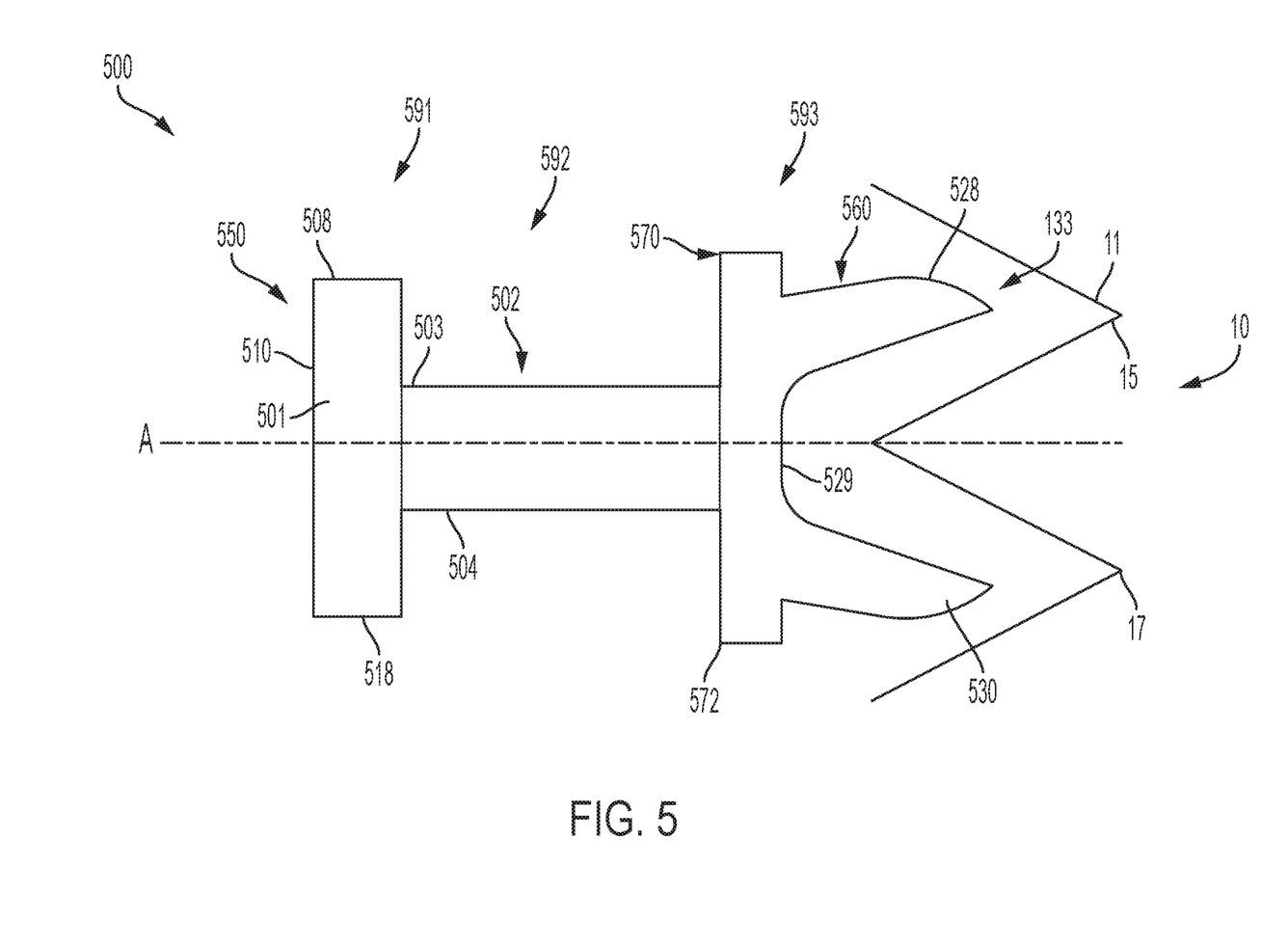
FIG. 5 is a side cross-sectional view of an impact beam assembly for a vehicle, according to another embodiment of the disclosure.

FIG. 5 illustrates an impact beam assembly 500 for a vehicle 10, according to an embodiment of the disclosure. The impact beam assembly 500 includes an impact beam 502 that is configured to approximately mimic the curves/bends/features of the fascia 11 of the vehicle 10 and minimize the crush space 133 defined between the fascia 11 and the impact beam 502.

Similar to the impact beams 102, 202, 302, 402 discussed above, the impact beam 502 is configured to fill the crush space 133 and follow the contours of the fascia 11. The impact beam 502 includes a body 501. The body 501 is defined by a first longitudinal surface 503 and a second longitudinal surface 504 approximately parallel to and spaced apart from the first longitudinal surface 503. In various embodiments, a first end 550 of the impact beam 502 includes two extensions 508, 518 that together with the first and second longitudinal surfaces 503, 504 form a "T" shaped body 501. In various embodiments, an end surface 510 forms a terminal end of the first end 550 of the body 501.

The impact beam 502 also includes a second end 560 opposite the first end 550. As shown in FIG. 5, the second end 560 includes two extended portions 528, 530. The extended portions 528, 530 are connected by a connecting surface 529. The second end 560 of the impact beam 502 is configured to follow the curves, bends, and other features of the fascia 11 and fill at least a portion of the air or crush space 133 between the impact beam 502 and the fascia 11.

The impact beam 502 is generally arranged along the longitudinal axis A such that the first end 550 and the second end 560 are separated by a distance along the longitudinal axis A. In various embodiments, as shown in FIG. 5, the impact beam 502 is symmetrical about the longitudinal axis A. However, in other embodiments, the impact beam 502 is asymmetrical about the longitudinal axis A, that is, a greater portion of either of the first end 550 or the second end 560 is positioned more on one side of the longitudinal axis A.

In various embodiments, the first end 550 of the body 501 is a first component 591 joined to a second component 592, wherein the second component 592 includes the body 501 formed from the first and second longitudinal surfaces 503, 504). In various embodiments, the second end 560 of the body 501 is a third component 593 coupled to the second component 592. In various embodiments, the first and second components 591, 592 are coupled by a chemical process such as welding and/or by one or more mechanical fasteners, such as bolts, etc. In various embodiments, the second and third components 592, 593 are coupled by a chemical process such as welding and/or by one or more mechanical fasteners, such as bolts, etc. In various embodiments, the first and second components 591, 592 are formed as a single component and the third component 593 is coupled to the unitary first and second component 591, 592 via a chemical process such as welding and/or one or more mechanical fasteners, such as bolts, etc. However, other embodiments include various other combinations of manufacture of the impact beam 502 from one, two, three, or more separate components.

In various embodiments, the extended portion 528 extends into the crush space 133 created by the feature 15 and, similarly, the extended portion 530 extends into the crush space 133 created by the feature 17. The extended portions 528, 530 may be rounded or otherwise shaped to fit within the crush space 133. As shown in FIG. 5, the extend portions 528, 530 are shaped to mimic the contours of the inner surface of the fascia 11. A connecting surface 529 connects the extended portions 528, 530 and, in various embodiments is either straight or curved to approximately follow or mimic the inner surface of the fascia 11 between the features 15, 17.

Similar to the impact beam 102, while not shown in FIG. 5, in some embodiments, the impact beam 502 includes one or more openings defined by edges to reduce the overall weight of the impact beam 502.

In various embodiments, the impact beam 502 includes one or more catch members 570, 572. The catch members 570, 572 extend away from the body 501 of the impact beam 502 and are configured to engage with an impact test structure, such as a pendulum. In various embodiments, as shown in FIG. 5, the catch members 570, 572 are symmetrically oriented relative to the longitudinal axis A. In other embodiments, the catch members 570, 572 are not symmetrically oriented relative to the longitudinal axis A.

While the embodiment illustrated in FIG. 5 includes two extended portions 528, 530, it is understood that other embodiments may include more or fewer extended portions, to align with the more or fewer features of the fascia 11 of the vehicle 10.

Figure 6:
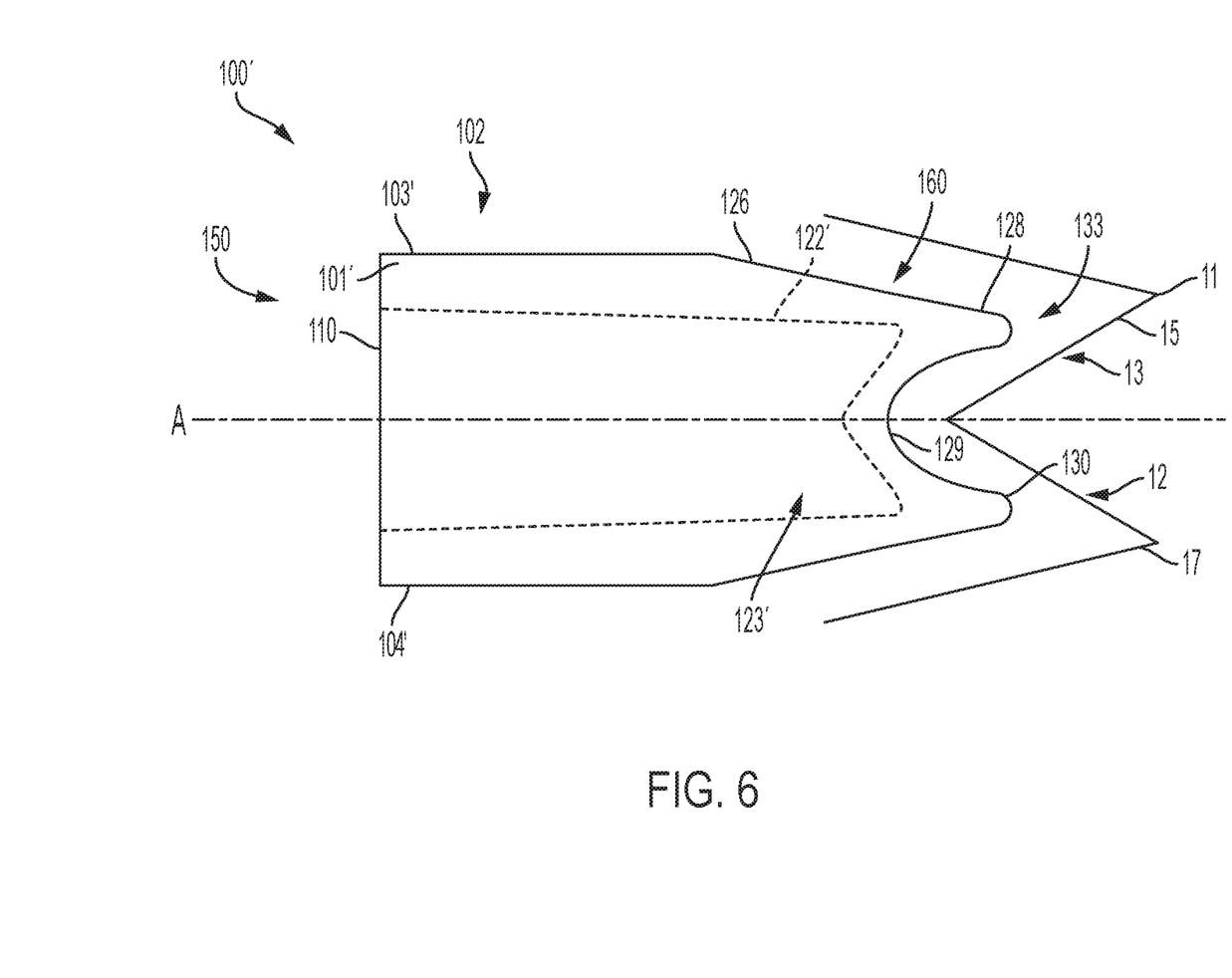
FIG. 6 is a side cross-sectional view of an impact beam assembly for a vehicle, according to another embodiment of the disclosure.
Figure 7:
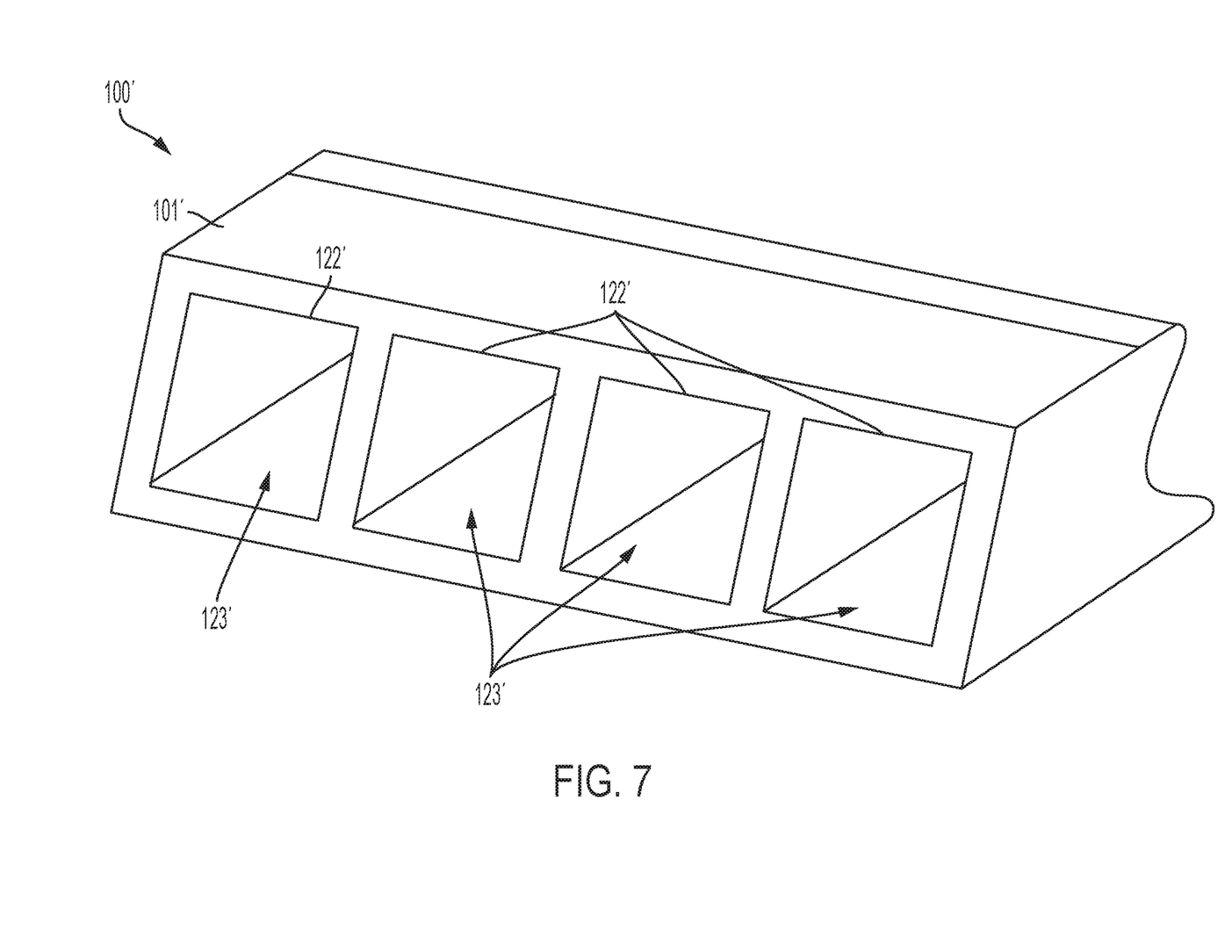
FIG. 7 is a rear perspective view of the impact beam assembly of FIG. 6, according to an embodiment of the disclosure.

FIGS. 6 and 7 illustrate an impact beam assembly 100' for a vehicle 10, according to an embodiment of the disclosure. The impact beam assembly 100' includes an impact beam 102' that is configured to approximately mimic the curves/bends/features of a fascia 11 of the vehicle 10 and minimize a crush space 133 defined between the fascia 11 and the impact beam 102'. The impact beam assembly 100' is similar to the impact beam assembly 100 shown in FIG. 1; however, the impact beam assembly 100' includes a plurality of openings or open sections, as shown in FIG. 7. Each cutout edge 122' defines an opening 123'. The impact beam 102' is locally hollowed to optimize casting during manufacture of the impact beam 102'. FIG. 7 illustrates four (4) parallel openings 123' that extend longitudinally through the body 101' of the impact beam 102'; however, other embodiments may have more or fewer openings 123' depending on the overall design of the impact beam, packaging and weight considerations, etc., for example and without limitation.

In various embodiments, the impact beam, such as the impact beams 102, 202, 302, 402, 502, are unitary or formed from a single piece of material in a casting process. In various embodiments, the impact beams 102, 202, 302, 402, 502 are formed in multiple pieces joined or coupled by welding and/or mechanical fasteners. For example, and without limitation, in various embodiments the impact beam 102 is formed by welding the first end, such as the first end 150, to one end of the body 101 and welding the second end 160 to an opposite end of the body 101. Similar processes may be used to form the other embodiments of the impact beam shown in FIGS. 2-5.

In various embodiments, the impact beams 102, 202, 302, 402, 502 are unitary or coupled cast aluminum components. In various embodiments, the impact beams 102, 202, 302, 402, 502 are unitary or coupled cast magnesium components or formed from any other durable material, such as carbon fiber.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "many," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the to is "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An impact beam for a vehicle, comprising:
   a body defining a longitudinal axis of the impact beam, the body having a first longitudinal surface laterally separated from a second longitudinal surface, a first end including a first extension and a second extension such that the first and second extensions form a "T"-shape with the first and second longitudinal surfaces of the body, and a second end opposite the first end, the second end including a first extended portion and a second extended portion connected to the first extended portion by a connecting surface;
   wherein the first extended portion is configured to extend into a first crush space defined by a fascia of the vehicle and the second extended portion is configured to extend into a second crush space defined by the fascia of the vehicle.

2. The impact beam of claim 1, wherein the first extended portion and the second extended portion are configured to mimic an inner surface of the fascia of the vehicle.

3. The impact beam of claim 1 further comprising a first cutout edge defining a first opening in the body of the impact beam.

4. The impact beam of claim 3 further comprising a second cutout edge defining a second opening in the second end of the impact beam.

5. The impact beam of claim 1 further comprising a first catch member extending in a first lateral direction away from the body of the impact beam and a second catch member extending in a second lateral direction away from the body of the impact beam opposite the first direction.

6. The impact beam of claim 5, wherein the first and second catch members are symmetrically oriented relative to the longitudinal axis of the body of the impact beam.

7. The impact beam of claim 5, wherein the first and second catch members are asymmetrically oriented relative to the longitudinal axis of the body of the impact beam.

8. The impact beam of claim 1, wherein the first extended portion includes a first terminal end portion and the second extended portion includes a second terminal end portion, the first terminal end portion forming a "J" shape with the first extended portion and the second terminal end portion forming a "J" shape with the second extended portion.

9. The impact beam of claim 1, wherein the body, the first end, and the second end are integrally formed as a single component and the single component is one of a cast aluminum component and a cast magnesium component.

10. The impact beam of claim 1, wherein the first end is welded to a first end of the body and the second end is welded to a second end of the body opposite the first end, and the first end, the body, and the second end, are formed from aluminum.

11. An automotive vehicle, comprising:
    an impact beam including a body defining a longitudinal axis and having a first longitudinal surface laterally separated from a second longitudinal surface, a first end including a first extension and a second extension such that the first and second extensions form a "T"-shape with the first and second longitudinal surfaces of the body, and a second end opposite the first end, the second end including a first extended portion and a second extended portion connected to the first extended portion by a connecting surface; and
    a fascia having an inner surface and an outer surface, the fascia including a curve creating a crush space between the inner surface of the fascia and the body of the impact beam;
    wherein the first extended portion is configured to extend into a first portion of the crush space defined by the fascia and the second extended portion is configured to extend into a second portion crush space defined by the fascia of the automotive vehicle.

12. The automotive vehicle of claim 11, wherein the first extended portion and the second extended portion of the impact beam are configured to mimic the inner surface of the fascia of the vehicle.

13. The automotive vehicle of claim 11, wherein the impact beam further comprises a first cutout edge defining a first opening in the body of the impact beam.

14. The automotive vehicle of claim 13, wherein the impact beam further comprises a second cutout edge defining a second opening in the second end of the impact beam.

15. The automotive vehicle of claim 11, wherein the impact beam further comprises a first catch member extending in a first lateral direction away from the body of the impact beam and a second catch member extending in a second lateral direction away from the body of the impact beam opposite the first direction.

16. The automotive vehicle of claim 15, wherein the first and second catch members are symmetrically oriented relative to the longitudinal axis of the body of the impact beam.

17. The automotive vehicle of claim 15, wherein the first and second catch members are asymmetrically oriented relative to the longitudinal axis of the body of the impact beam.

18. The automotive vehicle of claim 11, wherein the first extended portion includes a first terminal end portion and the second extended portion includes a second terminal end portion, the first terminal end portion forming a "J" shape with the first extended portion and the second terminal end portion forming a "J" shape with the second extended portion.

19. The automotive vehicle of claim 11, wherein the first end is welded to a first end of the body and the second end is welded to a second end of the body opposite the first end, and the first end, the body, and the second end, are formed from aluminum.

20. An impact beam for a vehicle, comprising:

a body defining a longitudinal axis of the impact beam, the body having a first longitudinal surface laterally separated from a second longitudinal surface, a first end, and a second end opposite the first end, the second end including a first extended portion and a second extended portion connected to the first extended portion by a connecting surface, the body including a plurality of cutout edges defining a plurality of parallel openings extending longitudinally through the impact beam;

wherein the first extended portion is configured to extend into a first crush space defined by a fascia of the vehicle and the second extended portion is configured to extend into a second crush space defined by the fascia of the vehicle and the impact beam is a unitary, cast aluminum component.

* * * * *